United States Patent
Marshall

(10) Patent No.: US 8,781,960 B2
(45) Date of Patent: *Jul. 15, 2014

(54) COMPUTERIZED METHOD TO ACCEPT AND SETTLE CASH TRANSACTION PAYMENTS

(71) Applicant: Roger Marshall, Tulsa, OK (US)

(72) Inventor: Roger Marshall, Tulsa, OK (US)

(73) Assignee: Pay Cash Now, LLC, Tulsa, OK (US)

(*) Notice: Subject to any disclaimer, the term of this patent is extended or adjusted under 35 U.S.C. 154(b) by 0 days.

This patent is subject to a terminal disclaimer.

(21) Appl. No.: 13/770,523

(22) Filed: Feb. 19, 2013

(65) Prior Publication Data

US 2014/0067657 A1    Mar. 6, 2014

Related U.S. Application Data

(63) Continuation of application No. 13/601,392, filed on Aug. 31, 2012, now Pat. No. 8,489,505, which is a continuation of application No. 11/843,976, filed on Aug. 23, 2007, now Pat. No. 8,321,342.

(60) Provisional application No. 60/823,742, filed on Aug. 28, 2006.

(51) Int. Cl.
    *G06Q 40/00*    (2012.01)

(52) U.S. Cl.
    USPC .............................. 705/40; 705/39; 235/379

(58) Field of Classification Search
    USPC .............................. 705/35–40; 235/379–381
    See application file for complete search history.

(56) References Cited

U.S. PATENT DOCUMENTS

| | | | |
|---|---|---|---|
| 6,029,150 A * | 2/2000 | Kravitz | 705/39 |
| 6,098,053 A * | 8/2000 | Slater | 705/44 |
| 6,305,603 B1 * | 10/2001 | Grunbok et al. | 235/379 |
| 6,415,555 B1 * | 7/2002 | Montague | 52/36.2 |
| 6,761,309 B2 * | 7/2004 | Stoutenburg et al. | 235/379 |
| 7,054,835 B2 * | 5/2006 | Nanbu et al. | 705/16 |
| 7,070,094 B2 * | 7/2006 | Stoutenburg et al. | 235/379 |
| 8,286,861 B2 | 10/2012 | Hansen et al. | |
| 2002/0082962 A1 * | 6/2002 | Farris et al. | 705/35 |
| 2002/0087462 A1 * | 7/2002 | Seifert et al. | 705/39 |
| 2003/0168508 A1 * | 9/2003 | Daellenbach et al. | 235/379 |
| 2003/0187791 A1 * | 10/2003 | Weichert et al. | 705/40 |
| 2003/0236746 A1 * | 12/2003 | Turner et al. | 705/40 |

(Continued)

FOREIGN PATENT DOCUMENTS

WO    WO00/13120    *    3/2000

*Primary Examiner* — Hani M Kazimi
(74) *Attorney, Agent, or Firm* — Head, Johnson & Kachigian, P.C.

(57) ABSTRACT

A system and method is provided to accept and settle transaction payments for a consumer. The consumer initiates a transaction with a merchant, and the merchant transmits transaction information to a central processing unit using an initiating processing unit. The central processing unit generates a unique transaction identifier. The system may provide the merchant and consumer the nearest payment processing unit. At the payment processing unit, the consumer presents the unique transaction identifier, which is transmitted to the central processing unit for validation. The consumer makes payment at the payment processing unit, and the payment information is transmitted to the central processing unit. The system remits the payment to the merchant.

16 Claims, 8 Drawing Sheets

(56) References Cited

U.S. PATENT DOCUMENTS

| | | | |
|---|---|---|---|
| 2004/0039702 A1* | 2/2004 | Blair et al. | 705/43 |
| 2004/0064405 A1* | 4/2004 | Weichert et al. | 705/39 |
| 2004/0236631 A1* | 11/2004 | Graham | 705/17 |
| 2005/0131821 A1* | 6/2005 | Eberhardt | 705/42 |
| 2006/0015428 A1* | 1/2006 | Friedman | 705/35 |
| 2006/0080240 A1* | 4/2006 | Mersky | 705/40 |
| 2006/0143124 A1* | 6/2006 | Ehrke | 705/40 |
| 2013/0036056 A1 | 2/2013 | Hansen et al. | |

* cited by examiner

COMPUTERIZED METHOD TO ACCEPT AND SETTLE CASH TRANSACTION PAYMENTS

CROSS-REFERENCE OF RELATED APPLICATION

This application claims priority to and is a continuation patent application of U.S. patent application Ser. No. 13/601,392, filed Aug. 31, 2012, which claims the benefit U.S. patent application Ser. No. 11/843,976, filed Aug. 23, 2007, now U.S. Pat. No. 8,321,342, issues Nov. 27, 2012, of which claims the benefit of U.S. Provisional Patent Application Ser. No. 60/823,724, filed Aug. 28, 2006, each of which is incorporated herein by reference in its entirety.

BACKGROUND OF THE INVENTION

1. Field of the Invention

Systems and methods are provided to accept and settle transaction payments for unbanked consumers. The consumer initiates a transaction by placing a product in their on-line shopping cart, making a telephone purchase, making a mail order/fax order from a merchant's catalog or other print advertisement, paying a one-time or reoccurring bill, loading a stored value card, making mobile payments using a mobile phone, or depositing money in a bank account. The merchant transmits transaction information, which may include the consumer's name, address, phone number, email address, merchant name, merchant number and/or amount due to a central processing unit. The central processing unit may be maintained by an intermediate, third-party service provider. The transaction information may be transmitted electronically in real-time, near real-time or using batch processing via an initiating processing unit or the merchant may contact a representative with access to the central processing unit who may input the transaction information. The central processing unit may generate a unique transaction identifier or the merchant may generate the unique transaction identifier which complies with the systems rules. In the event the merchant generates the unique transaction identifier, the merchant may notify the central processing unit of the transaction information and unique transaction identifier. The system may provide the merchant and/or consumer the location(s) of payment processing unit(s), which can include a manned kiosk, an unmanned kiosk, a point-of-sale terminal, a walk-up location or any other location capable of accepting payments. The payment processing unit may be in communication with the central processing unit. At the payment processing unit, the consumer presents the unique transaction identifier and/or transaction information, which is transmitted to the central processing unit for verification. The consumer may then make payment at the payment processing unit. The payment information is transmitted from the payment processing unit to the central processing unit. Upon payment, a receipt may be generated and the central processing unit may notify the merchant of payment by the consumer. The merchant may then fulfill the transaction based on its normal practices. The system may then remit the collected funds to the merchant in real-time, near real-time or as a batch process.

2. Description of the Related Art

Approximately twenty-two percent (22%) of the U.S. population is unbanked, which equates to approximately thirty to fifty million individuals. Another forty to forty-five million individuals have banking relationships, but are "underserved." These unbanked or underserved individuals combine for approximately seventy to ninety-five million individuals, and these individuals represent an estimated $600 to $800 billion in annual buying power. These consumers are largely shut out of making phone and web purchases, online purchases, television shopping networks and catalog retailers who cannot easily accommodate cash transactions. While unbanked consumers typically use check cashing outlets, supermarkets, prepaid top-up, money transfer, walk-in bill payment, etc. to conduct their "financial" services, most merchants do not have a process in place to accommodate them at the locations they typically frequent for cash management activities. Merchants looking to serve this market today lose impulse purchases or have to invest in unwieldy expensive processes.

Further, large populations of consumers today do not have a credit card or bank account, and therefore, lack a mechanism to pay for a wide variety of products and services, including web and phone purchases. Other consumers may be reluctant or unwilling to use their credit cards or bank accounts to pay for web and phone transactions for fear of identity theft, no credit card, maxed out credit limit or other reasons. Thus, there exists a need for a system and method which enables consumers to pay for these types of transactions, along with one-time and reoccurring bills, with the added ability to reload stored value cards or make banking deposits, conveniently with cash at local retail locations.

Typically stored value cards can be grouped into one of the four following broad categories: 1) closed system; 2) semi-closed system; 3) semi-open system; and 4) open system. Closed system cards are prepaid cards that can be used only for the purchase of goods or services from a single merchant. They often are purchased directly from a merchant and are sold in fixed denominations. Further, additional value cannot be added to closed system cards (i.e., they are not "reloadable"). Semi-closed system cards are similar to closed system cards, but rather than being redeemable at only a single merchant, semi-closed system cards can be used at multiple merchants. Semi-open system cards are accepted by any merchant who accepts debit cards and/or credit cards operating on a corresponding card network. They, however, do not allow cardholders to obtain cash from automated teller machines (ATMs), but these cards are often reloadable. Finally, open system cards are broadly the same as semi-open system cards with the added benefit of ATM functionality.

It is therefore desirable to provide a system and method to accommodate impulse purchases by creating a nationwide network of payment processing units with the ability to accept payments for telephone, catalog, mail order, online orders and other purchases of products and services for unbanked and underserved consumers.

It is further desirable to provide a system and method that allows consumers without credit cards or bank accounts to gain the ability to make purchases over the web, through the phone and pay for one-time or reoccurring bills, such as utility bills, car payments and a wide variety of other bills, using a convenient payment method. In addition, merchants gain access to a large new population of potential consumers.

SUMMARY OF THE INVENTION

The system and method provided herein are directed to a cash payment system for unbanked consumers. The system acts as an intermediary between a merchant and the consumer.

In general, the invention relates to a method to accept and settle transaction payments from a unbanked consumer. The consumer initiates a transaction with the merchant, resulting in transaction information that can be communicated from the merchant to a central processing unit. The central processing unit may be provided by an intermediary, third-party service provider. The central processing unit may generate a unique transaction identifier and may store the transaction information and the unique transaction identifier. The unique transaction identifier is communicated from the system to the consumer and/or merchant. The consumer presents the unique transaction identifier at a payment processing unit, which is validated by the central processing unit. Upon validation, the consumer makes payment for the transaction at the payment processing unit. After payment, the system remits the payment to the merchant.

The transaction may be initiated by the consumer with the merchant by making an on-line or telephone purchase, paying a one-time or reoccurring bill or making a mail order or catalog purchase. The unique transaction identifier may be generated by the central processing unit or by the merchant. In the former case, the unique transaction identifier is communicated to the merchant by the central processing unit. In addition to the unique transaction identifier, the central processing unit may communicate the location of payment processing units for the consumer.

At the payment processing unit, the consumer may be presented the transaction information for verification and validation. The consumer may make payment for the transaction using cash, a stored value card, making mobile payments, or by transferring money from an internet banking account. Further, the unique transaction identifier may be printed on the merchant's invoice, which may be read by the payment processing unit. Upon payment, the payment processing unit in communication with the central processing unit may generate a confirmation receipt for the transaction, which in turn can be transmitted to the consumer for their records. Further upon payment, the central processing unit may notify and remit payment to the merchant, at which time the merchant can fulfill the transaction according to its policies and procedures. The payment may be remitted to the merchant in real-time, near real-time or by batch processing.

Figure 1:
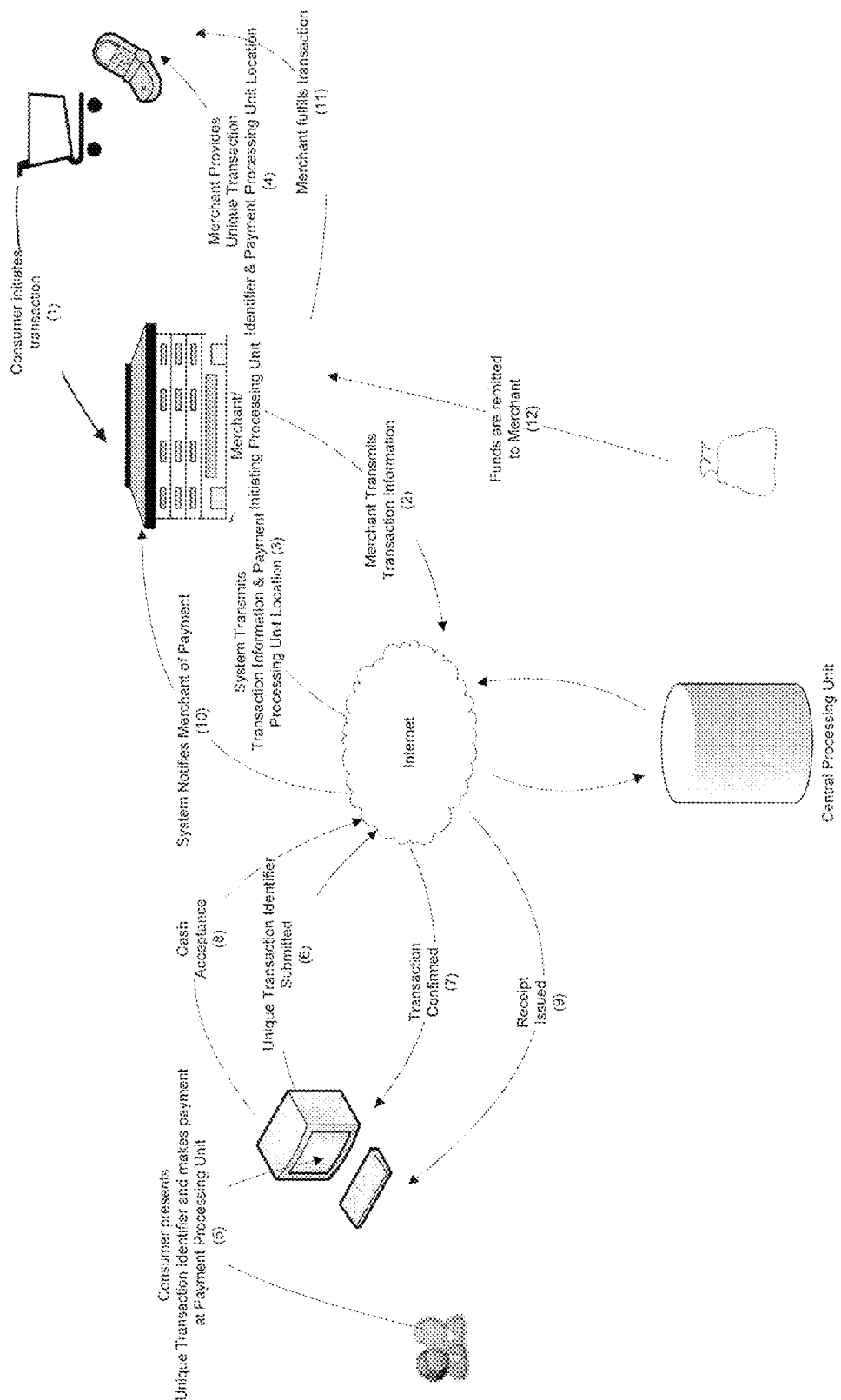
FIG. 1 is a system schematic providing a conceptual overview of some of components and steps of the method and system for execution of the method.

Other advantages and features will be apparent from the following description, and from the claims.

DETAILED DESCRIPTION OF THE INVENTION

The examples discussed herein are merely illustrative of specific manners in which to make and use the invention and are not to be interpreted as limiting in scope.

While the systems and methods have been described with a certain degree of particularity, it is to be noted that many modifications may be made in the details of the construction and the arrangement of components without departing from the spirit and scope of this disclosure. It is understood that the systems and methods are not limited to the examples set forth herein for purposes of exemplification.

A payment processing unit may be a manned walk-up payment center, point-of-sale terminal, a manned or unmanned kiosk or another other location with the ability to accept cash payments and stored value cards. The payment processing unit is able to communicate with a central processing unit in real-time, near real-time or even batch processing.

A consumer may be a person, household or entity without a checking or savings account, a credit card or those who may be reluctant, unable or willing to use its credit cards or bank accounts. A consumer may also be any person, household or entity who desires to make payment for a transaction using the methods and systems disclosed herein.

A merchant may be a selling merchant or service provider engaged on behalf of the merchant. The merchant may sell goods online, through catalogs (mail order, telephone order, etc.) or via television shopping networks. In addition, a merchant may be an entity that provides services, such as utilities, car loans, etc. The merchant may integrate the provided systems and methods into its existing web or call center system infrastructure.

A stored value card may include a wide variety of financial products, including gift cards, phone cards, teen cards, government benefit cards, travel cards, flexible spending account cards, subway system cards, employee incentive cards and payroll cards. Besides the broad array of stored value cards, they may be plastic, credit-card sized cards with a magnetic strip, bar code or embedded chip that permit the cardholders to access funds for the purchase of goods or services.

The system and method provided herein can be used with cash, stored value cards and internet banking accounts. In addition, the transactions of the systems and methods disclosed herein may be for telephone purchases, online purchases, catalog purchases, payment of one-time and reoccurring bills (daily, weekly, monthly, etc.), reload stored value cards or make deposits in bank accounts.

When a kiosk is used as the payment processing unit, the kiosk screen may display only one (1) button instead of pages of merchants from which the user can choose. The kiosk can be equipped with a reader to capture information on the merchant's invoice. The captured information may be a bar code on the invoice, or the kiosk can be equipped with optical character recognition in order to read the information, which may include the unique transaction identifier, on the merchants invoice or bill. The use information may also be captured using any other scanning or imaging mechanism or method capable of reading the information printed on the merchants invoice. In addition to being used at manned and unmanned kiosks, the systems and methods provided may be used at any location with a computer, from a consumer's cell phone, from any check cashing location, from coin machines and numerous other locations or facilities.

FIG. 1 is a system schematic providing a conceptual overview of some of components and steps of the method and system for execution of the method. A consumer places initiates a transaction with a merchant by placing a product in their on-line shopping cart or by making a telephone purchase (1). The consumer may also initiate a transaction by paying a one-time or reoccurring bill, initiating a mail order purchase transaction or initiating a catalog purchase transaction. The merchant may transmit transaction information (2) to a central processing unit in real-time, near real-time or by batch processing using an initiating processing unit. The transaction information may include the consumer's name, address, telephone number, email address, the merchant's name, merchant number, order number or amount due. The central processing unit may generate a unique transaction identifier (3), or alternatively, the merchant may generate the unique transaction identifier which complies with the systems rules. In the later case, the merchant would notify the central processing unit of the transaction information and unique transaction identifier. If applicable, the system may provide the merchant and consumer location(s) of payment processing unit(s) (4). The payment processing unit may be a manned kiosk, an unmanned kiosk, a point-of-sale terminal, a walk-up location or any other payment accepting location. At the payment processing unit, the consumer presents the unique transaction identifier (5), which is transmitted to the central processing unit for validation (6). Upon validation of the unique transaction identifier, the consumer may also validate the transaction information to ensure it is the proper transaction (7). The consumer then may make payment at the payment processing unit (8), and the payment information is transmitted to the central processing unit. The system may generate a confirmation receipt (9). The system notifies the merchant of payment by the consumer (10). The merchant may then fulfill the transaction (11) and the system remits the collected funds to the merchant (12). The system may remit the funds in real-time, near real-time or by batch processing.

Figure 2A:
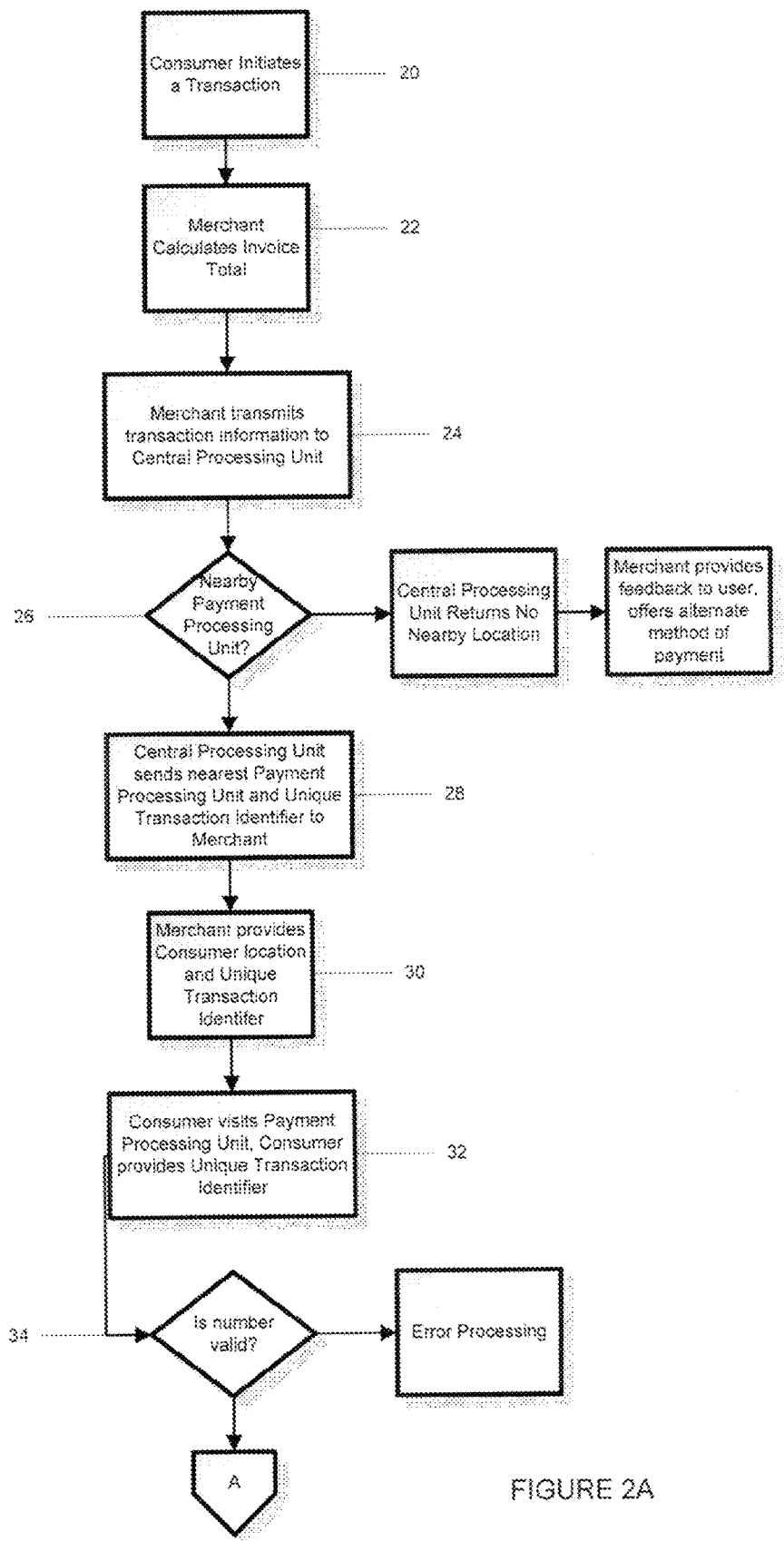
FIGS. 2A and 2B are flow charts of the system to accept and settle transaction payments for consumers, as illustrated in FIG. 1.
Figure 2B:
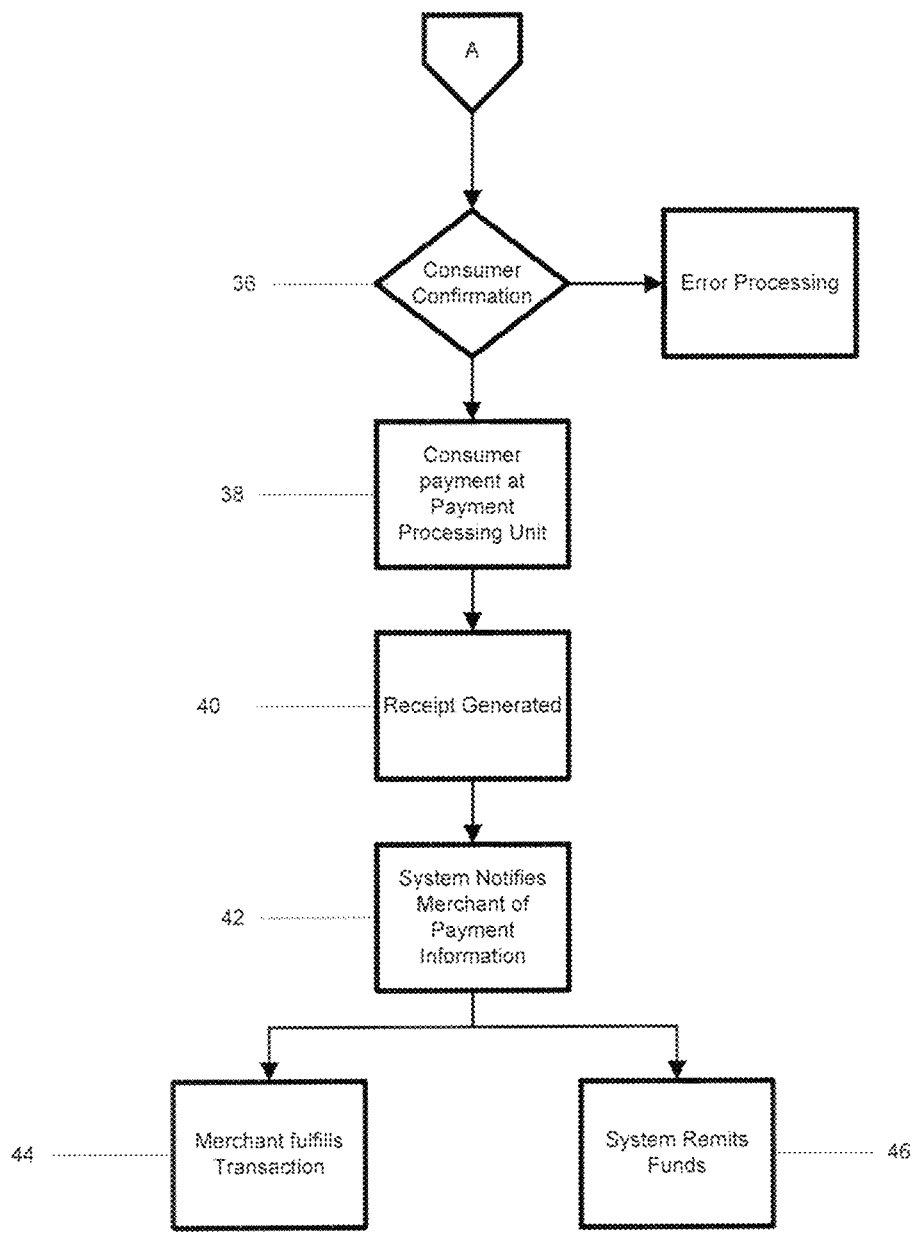

FIGS. 2A and 2B are flow charts of with the system to accept and settle transaction payments for consumers, as illustrated in FIG. 1. A consumer would initiate a transaction (20) with a merchant by making an on-line purchase, making a telephone purchase, paying a one-time bill, paying a reoccurring bill, making a mail order purchase or making a catalog purchase. Based on the transaction, the merchant may generate transaction information (22), which may be communicated to a central processing unit (24). The merchant may generate the transaction information using an initiating processing unit that is in communication with the central processing unit. The central processing unit or the merchant would generate a unique transaction identifier associated with the transaction. If the merchant generates the unique transaction identifier, it would transmit the unique transaction identifier and transaction information to the central processing unit (24). Upon receipt and/or generation of the foregoing information, the central processing unit may transmit locations of payment processing units to the merchant and/or consumer (26, 28). The unique transaction identifier may be communicated to the consumer (30). The consumer would go to a payment processing unit to make payment (32), which may be a manned kiosk, an unmanned kiosk, a point-of-sale terminal, a walk-up location or any other location capable of accepting payment for the transaction. At the payment processing unit, the consumer would communicate the unique transaction identifier to the payment processing unit (32). The payment processing unit would communicate the unique transaction identifier to the central processing unit for validation (34). Upon validation of the unique transaction identifier, the central processing unit may communicate the transaction information to the payment processing unit allowing the consumer to validate the transaction information (36). Once the unique transaction identifier and transaction information are validated (36), the consumer may make payment for the transaction (38). Upon payment, the system may generate a confirmation receipt (40). The payment processing unit may communicate the payment information to the central processing unit, which in turn may communicate the payment information to the merchant and/or initiating processing unit (42). The merchant may then fulfill the transaction according to its policies and procedures (44). The central processing unit may remit payment to the merchant in real-time, near real-time or by batch processing (46).

The system may accept monthly, bi-weekly, weekly or any other types of payments giving the consumer a real-time cash receipt. When the systems and methods disclosed herein are used to accept one-time or reoccurring bills, the merchant, which could be a utility company, magazine subscription, loan processor or numerous other types of entities, may elect to put a unique transaction identifier on their invoice. At the payment processing center, the consumer may input the unique transaction identifier located on the merchant's invoice or bill, and the bill would display on the screen of the payment processing unit for confirmation. In addition, the payment processing unit may be in communication with the balance files of the merchant, thus allowing the consumer to be given their balance in real-time. If the payment processing unit is not in communication with the merchant's balance files, the consumer may elect how much to pay on the pending invoice. The consumer may then make payment and the system may generate a receipt with a confirmation number.

Figure 3:
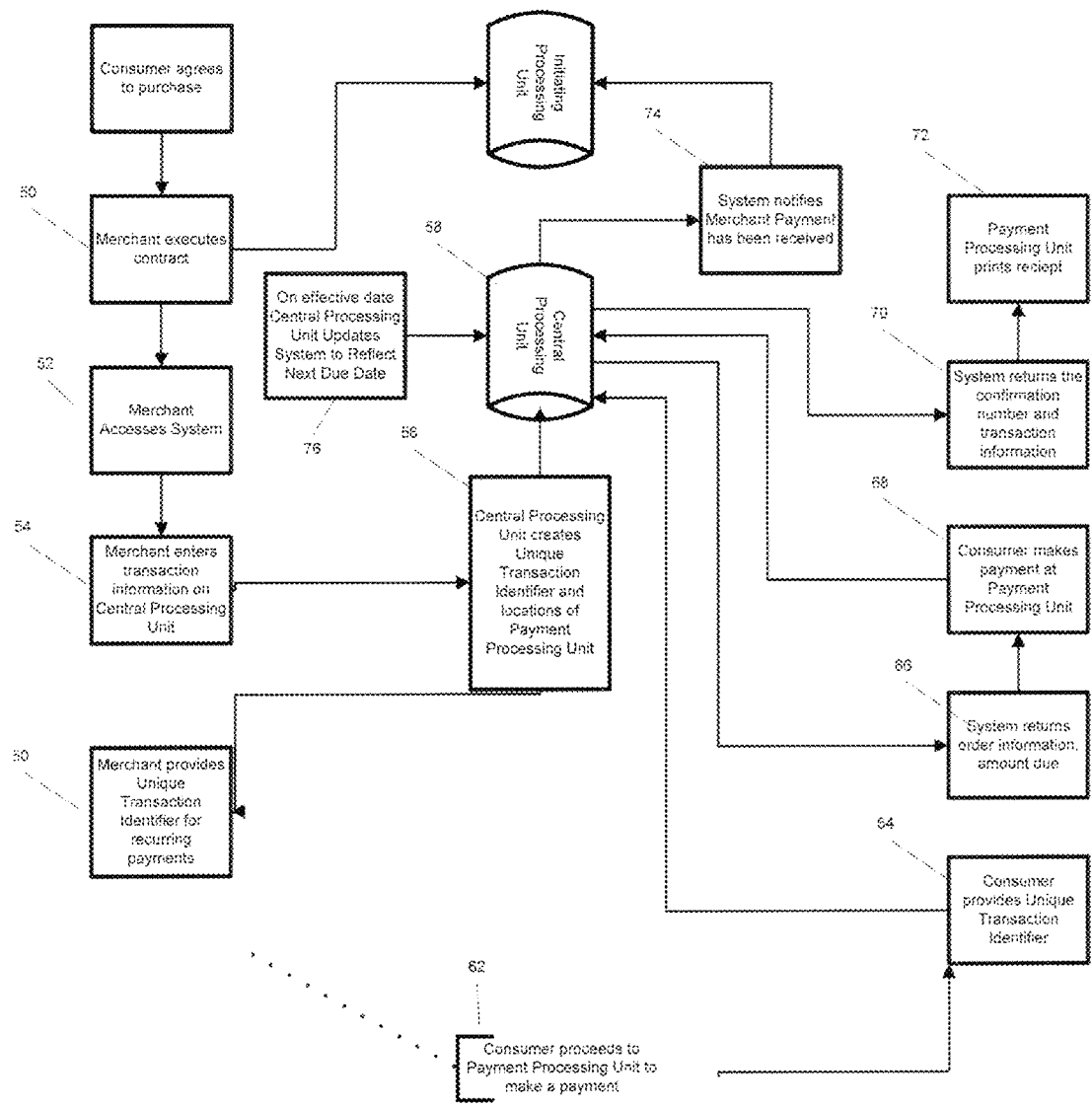
FIG. 3 is a flow chart providing a conceptual overview of payment of reoccurring bills using the provided methods and systems.

FIG. 3 is a flow chart providing a conceptual overview of payment of reoccurring bills using the provided methods and systems. Under this example, the merchant may specify payments in varying or fixed amounts (50). The merchant may access the central processing unit through the Internet or may initiate a transaction by contacting a representative with access to the central processing unit (52). The merchant or the representative may input the transaction information into the central processing unit (54). The transaction information may include the customer's name, address, telephone number, email address, the merchant's name, merchant number, the payment amount, the number of reoccurring payments, the reoccurring payment initiation date or the reoccurring payment period, i.e., weekly, biweekly, monthly, etc. The central processing unit may then generate a unique transaction identifier, and based on the consumer's zip code, may provide locations of payment processing units (56). The transaction information and unique transaction identifier are stored on the central processing unit (58). The unique transaction identifier is then provided to the merchant and/or consumer (60). The consumer would make payments of the merchant's bill at a payment processing unit (62). At the payment processing unit, the consumer may enter the unique transaction identifier and/or a portion of the transaction information (64), or if the payment processing unit is provided with a reader, the payment processing unit may scan the merchant's invoice or bill for the unique transaction identifier and/or pertinent transaction information. The payment processing information may communicate summary balance information or transaction information to the consumer, which may include the due date, amount due to the merchant and the unique transaction identifier (66). If the information is correct, the consumer would make payment (68). The system may generate a confirmation receipt that may include a confirmation number, the amount paid, the unique transaction identifier associated with the transaction, the date and time of payment and the location of the payment processing unit (70). The payment processing unit may provide a confirmation receipt to the consumer (72). The system communicates payment information to the merchant (74). The system may then update the transaction information to reflect the next due date and amount due (76). If no payment is made on the day after the due date, the system may update to reflect the next due date for payment.

Figure 4:
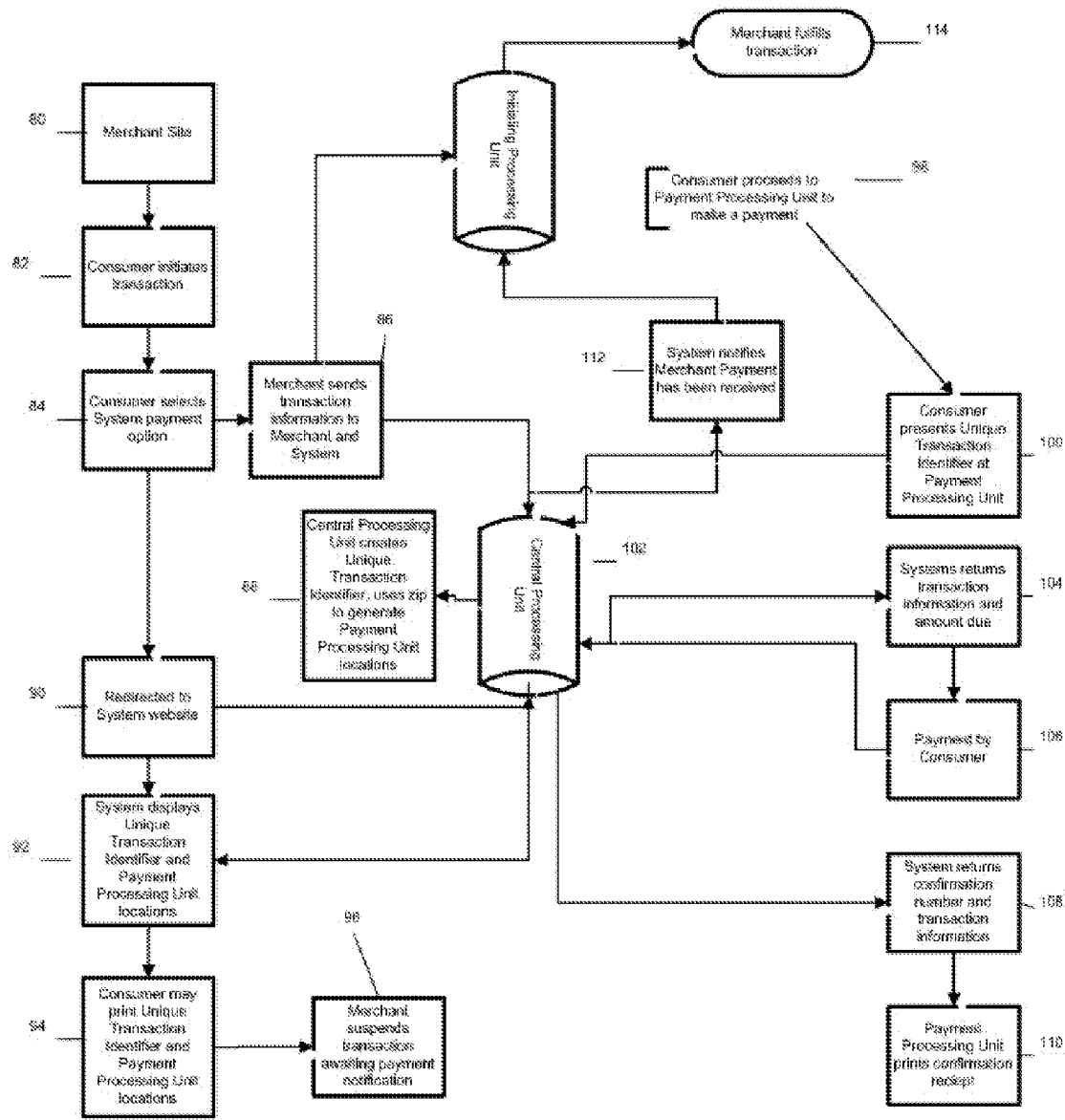
FIG. 4 is a flow chart illustrating the process steps associated with the system to accept and settle transaction payments for consumers using a redirect payment method.

FIG. 4 is a flow chart illustrating the process steps associated with the system to accept and settle transaction payments for consumers using a redirect payment method. In this example, the consumer may make an online purchase (82) through a merchant's website (80). Upon initiating the transaction, the consumer may select to make payment using the system provided herein (84). The merchant may generate transaction information using an initiating processing unit. The initiating processing unit or merchant may communicate the transaction information to a central processing unit (86). The central processing unit may generate a unique transaction identifier associated with the transaction (88). The consumer would be redirected to a webpage associated with the central processing unit (90). The central processing unit webpage may display the unique transaction identifier, locations of payment processing units, the merchant name, the merchant's order number, the amount due, and an expiration date (92). The customer may print or record the unique transaction identifier and/or location of the payment processing unit (94). The merchant may suspend the transaction and await confirmation of payment from the central processing unit (96). At the payment processing unit (98), the consumer may provide the unique transaction identifier (100). The payment processing unit would communicate the unique transaction identifier to the central processing unit for validation (102). Upon validation, the central processing unit would communicate the transaction information to the payment processing unit for verification by the consumer (104). If the customer cannot verify the transaction information, the payment processing unit may abandon the transaction and direct the consumer back to the merchant to acquire a correct unique transaction identifier. If the unique transaction identifier and transaction information are successfully verified, the consumer may make payment at the payment processing unit (106). The payment information is communicated from the payment processing unit to the central processing unit where a confirmation receipt is generated for the transaction (108). The central processing unit communicates the confirmation receipt to the payment processing unit, which may print the receipt for the consumer's records (110). The receipt may include the merchant's name, order number, amount paid, date and time of payment and the payment processing unit's location. The central processing unit communicates the payment information to the initiating processing unit or to the merchant (112). The merchant may then fulfill the order according to its policies and procedures (114).

Figure 5:
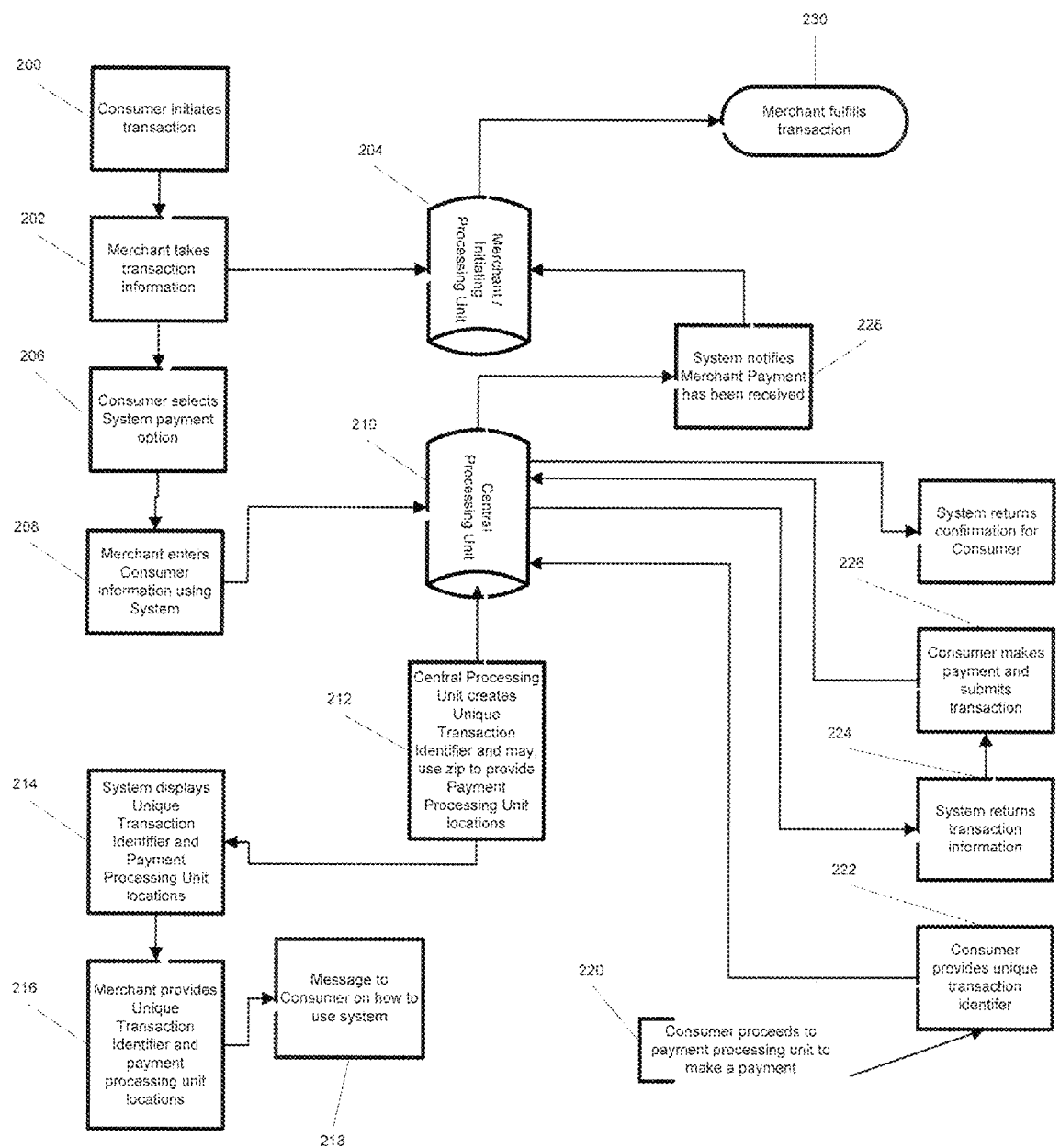
FIG. 5 is a flow chart associated with the system to accept and settle transaction payments for consumers making telephone purchases.

FIG. 5 is a flow chart illustrating the process steps associated with the system to accept and settle transaction payments for consumers making telephone purchases. The telephone purchases may involve transactions with television shopping networks, such as QVC® or HSN®. In this example, the consumer would initiate the transaction by placing a telephone order (200) with a merchant (202). The merchant's representative may record the transaction information at an initiating processing unit (204), and the consumer may make the election for payment using the systems disclosed herein (206). The transaction information may then be communicated to a central processing unit (208), which would store the transaction information (210). The transaction information may include the customer's name, address, telephone number, email address, merchant's name, merchant's number and the amount of order. The central processing unit may generate and communicate the unique transaction identifier to the merchant (212). Based on the consumer's zip code, the central processing unit may provide locations of payment processing units (214). The merchant may then communicate the unique transaction identifier and payment processing locations to the consumer (216). The consumer may also be sent and mail or other message on how to the use the system (218). The consumer would go to the payment processing unit (220) and provide the unique transaction identifier (222). The unique transaction identifier is communicated from the payment processing unit to the central processing unit for validation. In response, the central processing unit may communicate the transaction information to the payment processing unit for verification (224). The consumer may make payment (226) and the system may notify the merchant of payment (228). This notification process can take a number of different forms, such as sending a confirmation e-mail to the merchant informing it of payment or sending a post deposit to the merchant's banking account. Based on this notification, the merchant may fulfill the transaction pursuant to its policies and procedures (230).

Figure 6:
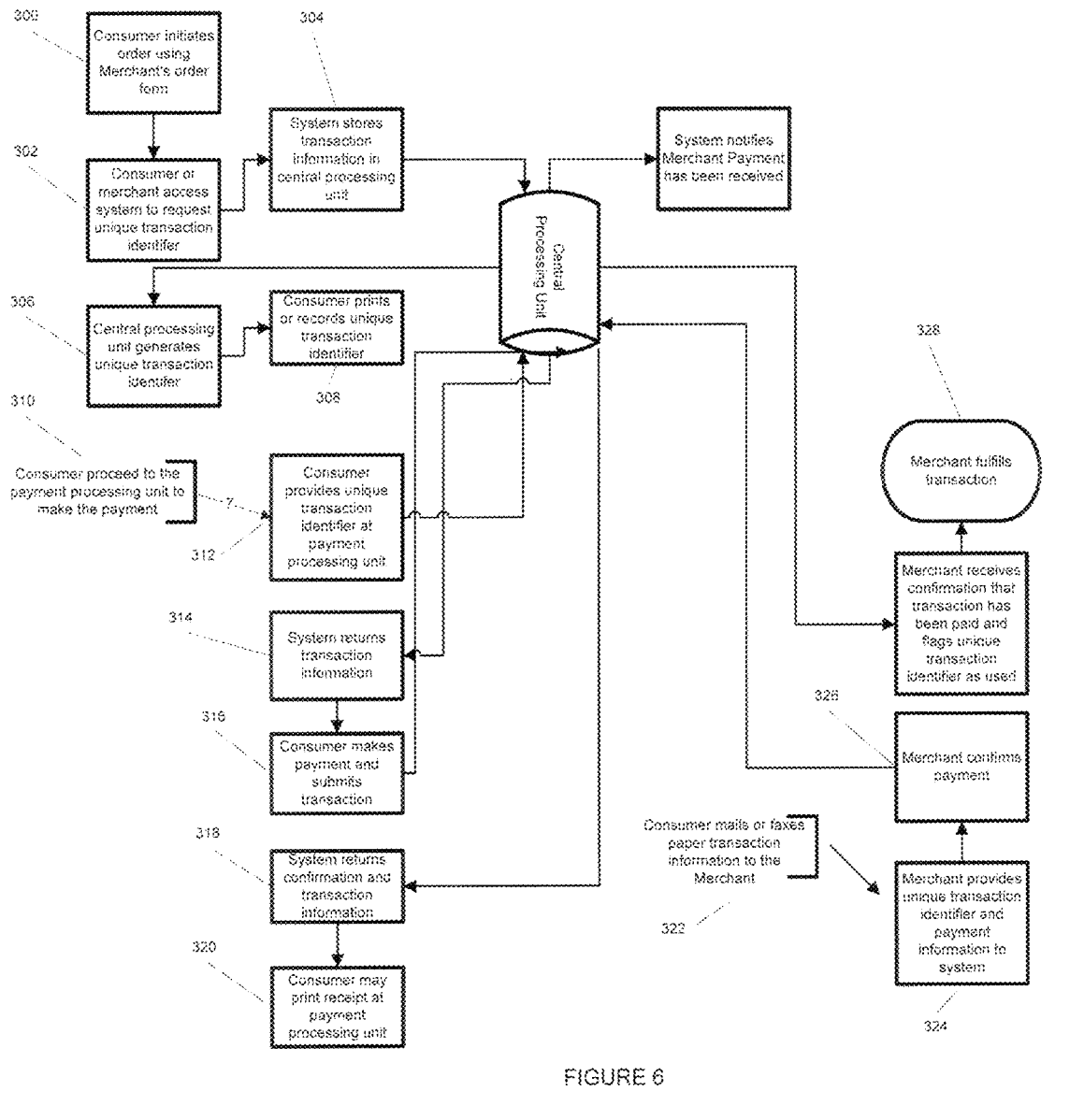
FIG. 6 is a flow chart associated with the system to accept and settle transaction payments for consumers making mail order or catalog purchases.

FIG. 6 is a flow chart illustrating the process steps associated with the system to accept and settle transaction payments for consumers making mail order or catalog purchases. In this example, a consumer may initiate a transaction using a merchant's order form (300). The consumer or merchant may access a webpage associated with a central processing unit and request a unique transaction identifier (302). The consumer may communicate transaction information to the central processing unit, which may include the customer's name, address, telephone number, email address, merchant's name and amount of order. The central processing unit may store the transaction information (304) and generate a unique transaction identifier associated with the transaction (306). The central processing unit may communicate the unique transaction identifier, merchant name and locations of payment processing units to the consumer (308). At the payment processing unit (310), the consumer may communicate the unique transaction identifier to the payment processing unit (312), which communicates the unique transaction identifier to the central processing unit. The central processing unit may then communicate the transaction information to the payment processing unit for verification (314). If the transaction information is correct, the consumer may make payment for the transaction (316). The payment processing unit may then transmit the payment information to the central processing unit (316). The payment information may include the unique transaction identifier, the merchant name, order number, customer name and amount due. The central processing unit may generate a confirmation receipt (318), which may be given to the consumer for their records (320). The central processing unit may then communicate the transaction information and unique transaction identifier to the merchant, or alternatively, the consumer may fax or mail the confirmation receipt directly to the merchant as proof of payment for the transaction (322). Upon receipt of confirmation from the central processing unit or from the consumer (324), the merchant may then confirm payment (326) and fulfill the transaction (328). The system may remit payment to the merchant in real-time, near real-time or by batch processing.

Figure 7:
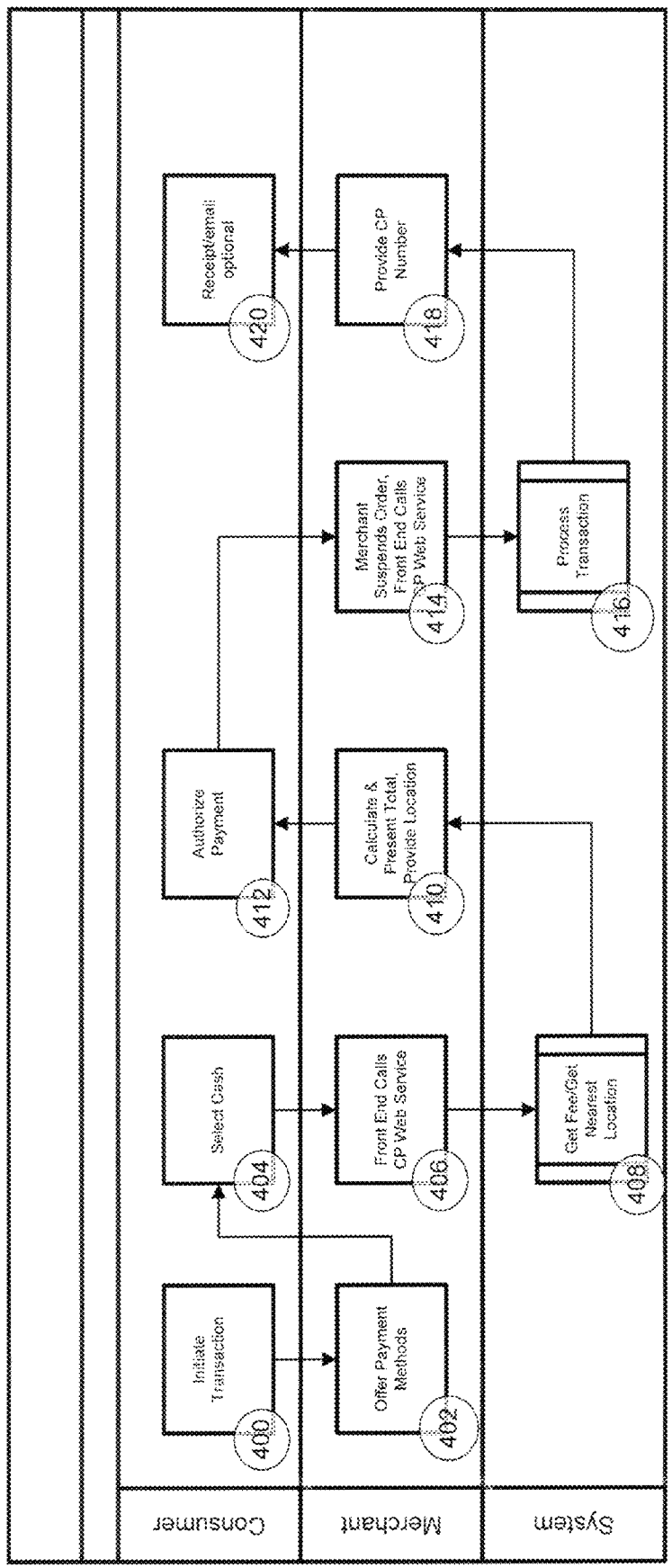
FIG. 7 is a Swim Lane diagram for the merchant's request of a unique transaction identifier according to the present systems and methods.

FIG. 7 is a Swim Lane diagram illustrating the process steps for the merchant's request of a unique transaction identifier according to the present systems and methods. The consumer initiates a transaction with a merchant (400). The merchant may offer various payments methods for the transaction (402), and if the consumer selects the methods and systems disclosed herein as payment (404), the merchant or the merchant's initiating processing unit may communicate (406) with the central processing unit for locations of payment processing units (408). The central processing unit may transmit the locations of payment processing units (410). The consumer may then authorize payment based on these locations (412). Upon approval, the merchant may suspend the transaction and communicates with the central processing unit of approval of the transaction (414). The central processing unit may then generate a unique transaction identifier (416) and communicate the unique transaction identifier to the merchant (418). The merchant may then communicate the unique transaction identifier to the consumer. The merchant may generate a confirmation receipt, instructions or other messages (420).

The systems and methods disclosed herein may also be used with internet banking accounts, which do not typically have local branches for consumers to make deposits or conduct other transactions. Typically, in order for a consumer to make a deposit into an internet banking account, the check or cash must be mailed or couriered to the internet banking site. Thus, the funds will not be immediately available and the consumer runs the risk of their deposit being lost in transit. In this example, the internet bank would place a unique transaction identifier on its bank statements or on its debit/credit cards which may correspond to a unique transaction identifier stored on the central processing unit of the present system. This unique transaction identifier may correspond to the consumer's deposit account. If the consumer wished to make a deposit, they would input their cash at a payment processing unit. The payment processing unit may communicate receipt of deposit to the central processing unit. The central process unit may then communicate the deposit information to the bank in real-time for immediate funds availability.

In another example, a credit, debit or stored value card issuer may print a unique transaction identifier on the face of its cards. The unique transaction identifier may be mapped by the central processing unit to the consumer's account. This would allow a single unique transaction identifier to be mapped to the account, which allows the consumer to make deposits or reload their cards at any payment processing unit. The payment processing unit does not have to be a branch office affiliated with the card issuer. Alternatively, the unique transaction identifier may be mapped to a consumer's telephone or mobile phone number, enabling the mobile phone to act as a virtual wallet by allowing the consumer to make purchases. In the case of pre-paid phones, this would allow the consumer to purchase additional minutes for use with their mobile phone using the unique transaction identifier associated with their phone number. Further, the systems and methods disclosed herein may be used with Coinstar® machines. The consumer may deposit coins into the machines, enter their unique transaction identifier which may correspond to a stored value card or other account. The unique transaction identifier and stored value card or other account information may be stored on the central processing unit.

What is claimed is:

1. A computerized method to accept and settle cash transaction payments, said computerized method comprising the steps of:
   initiating a non-store retailing, cash transaction between said unbanked consumer and a merchant; and wherein said consumer is remote from said merchant;
   b. electronically communicating transaction information from said merchant to a central processing unit having a memory and a processor and being hosted and/or maintained by an intermediate, third-party service provider, and wherein said central processing unit is remote from said merchant and from said consumer;
   c. subsequent to steps a and b, generating a unique transaction identifier by said central processing unit for said non-store retailing, cash transaction;
   d. electronically storing said transaction information and said unique transaction identifier at said central processing unit;
   e. communicating said unique transaction identifier from said central processing unit to said merchant;
   f. subsequent to step e, receiving said unique transaction identifier from said consumer at a payment processing unit, wherein said payment processing unit is remote from said merchant and from said central processing unit, wherein said payment processing unit is maintained by said service provider, wherein said payment processing unit is constructed to accept cash payments from said consumer;
   g. electronically communicating said unique transaction identifier from said payment processing unit to said central processing unit;
   h. electronically validating said unique transaction identifier using said central processing unit;
   i. receiving a cash payment from said consumer for said non-store retailing, cash transaction at said payment processing unit; and
   j. subsequent to step i, remitting an equivalent of said cash payment to said merchant.

2. The method of claim 1 wherein said non-store retailing, cash transaction includes an on-line purchase transaction, a telephone purchase transaction, a one-time bill, a reoccurring bill, a mail order purchase transaction or a catalog purchase transaction.

3. The method of claim 1 wherein said step of communicating said unique transaction identifier to said merchant further comprises the steps of communicating locations of said payment processing unit from said central processing unit to said merchant, and subsequently communicating said unique transaction identifier and locations of said payment processing unit from said merchant to said consumer.

4. The method of claim 1 wherein said step of electronically validating said unique transaction identifier further comprises displaying said transaction information to said consumer and/or said retailer at said payment processing unit.

5. The method of claim 4 further comprising the step of validating said transaction information by said consumer and/or said retailer at said payment processing unit.

6. The method of claim 1 further comprising subsequent to step i, generating a unique confirmation number by said central processing unit and transmitting said unique confirmation number from said central processing unit to said payment processing unit.

7. The method of claim 6 further comprising the step of generating a confirmation receipt for said consumer at said payment processing unit.

8. The method of claim 7 further comprising the step of printing said confirmation receipt for said consumer using said payment processing unit and/or electronically transmitting said unique transaction identifier to a cellular phone of said consumer.

9. The method of claim 1 further comprising subsequent to step i, electronically notifying said merchant of said cash payment by said consumer using said central processing unit.

10. The method of claim 1 further comprising the step of fulfilling said transaction by said merchant.

11. The method of claim 1 wherein said step of remitting said payment to said merchant is in real-time, near real-time or by batch processing.

12. The method of claim 1 wherein said transaction information comprises purchase information, said consumer's name and/or unique identifier which uniquely identifies said consumer to said merchant.

13. The method of claim 10 further comprising subsequent to step j, fulfilling said transaction by said merchant.

14. The method of claim 10 further comprising prior to step j, fulfilling said transaction by said merchant.

15. The method of claim 1 further comprising prior to step f, suspending said cash transaction until subsequent to step i.

16. The method of claim 1 further comprising prior to subsequent to step i, notifying said merchant of said cash payment by said consumer at said payment processing unit using said central processing unit.

* * * * *